Patented May 12, 1953

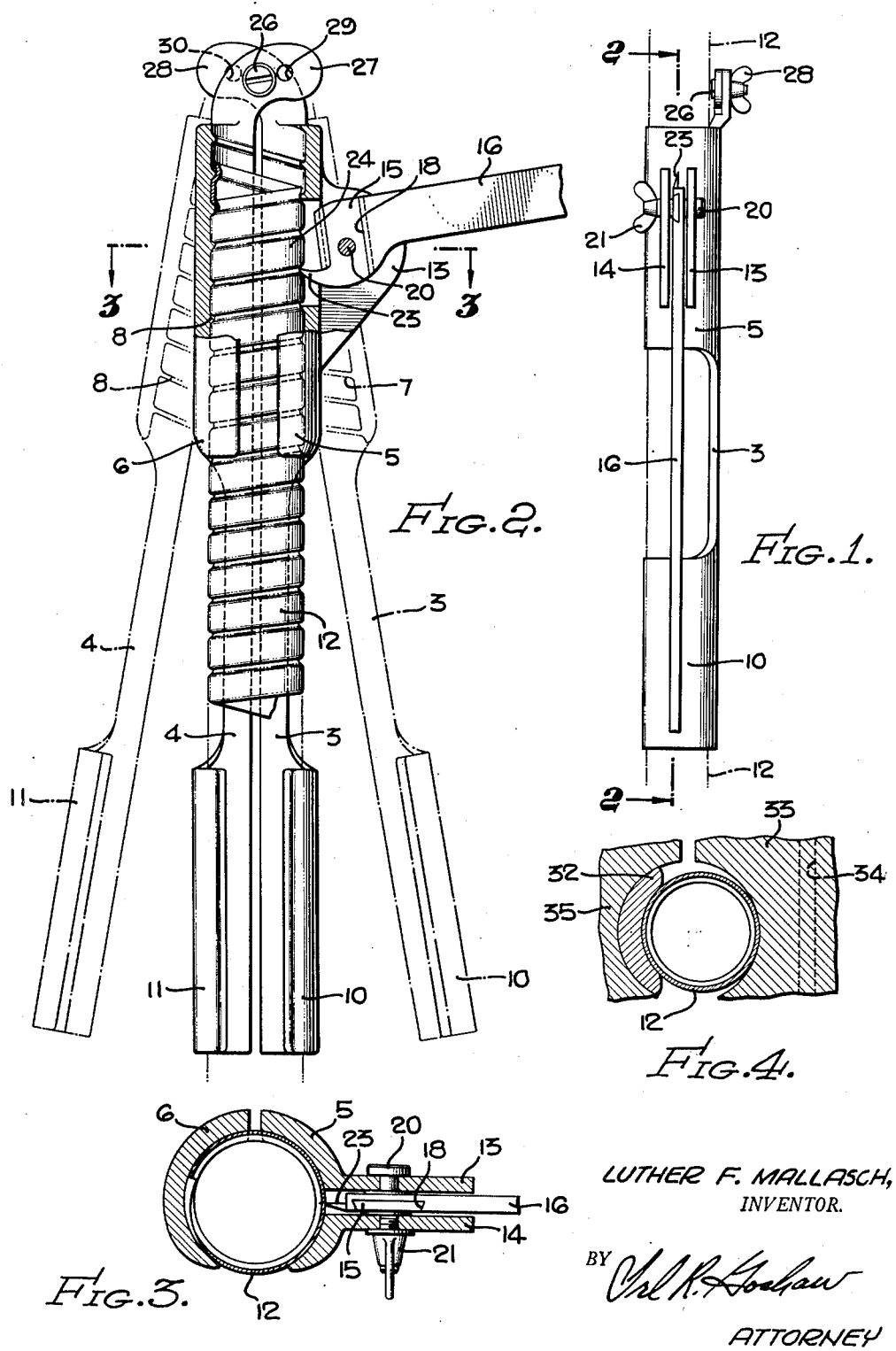

2,637,903

UNITED STATES PATENT OFFICE 2,637,903

FLEXIBLE CONDUIT CUTTER

Luther F. Mallasch, Glendale, Calif.

Application August 18, 1950, Serial No. 180,169

4 Claims. (Cl. 30—91)

This invention relates to cutting tools, and particularly to a tool for easily and rapidly cutting flexible conduits.

Tools for the purpose of cutting flexible conduits are known, one such tool being disclosed and claimed in U. S. Patent No. 2,246,350 of June 17, 1941. The tool disclosed in this patent is of the plier type. The present invention is adapted to rapidly cut one turn of either the "flex" type of flexible conduit, or the "BX" type of flexible conduit which contains electrical conductors. The patented tool is for "BX" cable. The hereinafter described tool is adapted to rapidly and accurately cut any turn at any particular point and in such a manner as to meet certain electrical code provisions wherein no internal burrs must remain after the cutting operation to injure the insulation of the wires enclosed by the conduit. Not only is the tool quickly applied to the conduit, but a single tool may be used for more than one size of conduit. It does not pinch the cable, but holds it against longitudinal movement during the cutting operation which is parallel to the axis of the cable and from the inside outwardly.

The principal object of the invention, therefore, is to facilitate the cutting of flexible conduits of the articulated helical cable type.

Another object of the invention is to provide a flexible conduit cutting tool whereby the burr, if any, is on the external surface of the conduit.

A further object of the invention is to provide a flexible conduit cutter for rapidly and accurately cutting one turn of the conduit at a particular point, the cutter being adaptable for conduits of different sizes and of either the "flex" or "BX" types.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a plan view of the cutter embodying the invention.

Fig. 2 is a cross-sectional view taken along the line 2—2 of Fig. 1.

Fig. 3 is a cross-sectional view taken along the line 3—3 of Fig. 2, and

Fig. 4 is a cross-sectional view showing a modification of the tool and how it is adaptable to conduits of different sizes.

Referring now to the drawings, the tool is made up of two main semicircular jaws 5 and 6, which, as shown by the dotted lines at 7 and 8, have their inner surfaces corrugated to accommodate the helical turn or turns forming the conduit 12. When the jaws are positioned parallel and around the conduit 12, by the semicircular handles 10 and 11, as shown in Fig. 2 by the solid lines, the conduit will be held firmly in position against relative axial or longitudinal movement thereof with respect to the jaws during the cutting operation. The handles are connected to the jaws by reduced portions 3 and 4.

Pivoted between two flanges 13 and 14 on jaw 5, is a cutter unit 15, which is positioned in a groove 18 of a handle 16. The cutter unit is rectangular and has beveled edges which are accommodated in a corresponding bevel sided groove 18, as shown in Fig. 3. Both the handle 16 and cutter unit 15 are held between the flanges 13 and 14 and pivoted on a bolt 20 having a wing nut 21 on the end thereof. As shown clearly in Fig. 2, the cutter has a curved, pointed blade or tooth 23, the point of which is adapted to enter the space between turns of the conduit 12, and when the handle is pulled downwardly, as shown in the drawing, the cutter point will lift and cut through a turn such as shown at 24 from the inside outwardly. When the cutter blade 23 is kept sharp, a very clean or smooth cut is made, and any burr remaining will be on the outer surface of the turn to comply with code provisions. The tool also simply holds the blade against longitudinal movement, and does not put any pressure on the conduit. It is, therefore, particularly suitable for hollow cable conduits.

When the tool is not being used, the handle is positioned parallel with the jaws 5 and 6, and the flanges 13 and 14 are long enough to enclose the cutter blade 23 to prevent injury to the cutter or other articles. The two jaws 5 and 6 are pivoted on a bolt 26 connecting ears 27 and 28 extending from the ends of the jaws, the bolt 26 having a wing nut 28 to hold the ears in position. The ears are slightly offset so as not to interfere with the positioning of the conduit between the jaws. In the ears 27 and 28, are additional holes such as shown at 29 and 30, which permit the jaws to be pivoted at different points for different sized conduits.

To accommodate a conduit smaller than that shown at 12 in Figs. 1, 2, and 3, the tool is adaptable to smaller conduits by using an insert in the jaw 6, so as to place the smaller conduit up against jaw 5 so that the cutter blade 23 can cut the turn of the conduit. Such an insert is shown at 32 in Fig. 4, which also shows a different shape for the jaws 5 and 6. Jaw 33 is made from rectangular stock with a curved, inner surface similar to the inner surface of jaw 5. The jaw 33 is thick enough so that the cutter 15 and handle 16 may be accommodated in a slot cut or molded therein. The hole for the pivot bolt is shown by dotted lines 34. Thus, flanges 13 and 14 are eliminated. The other jaw 35 may be made from stock of smaller dimensions. The handle portions 10 and 11 may be rounded.

I claim:

1. A cutting tool for conduits comprising a pair of jaws having handles at the ends of said jaws, said jaws when closed forming a channel adapted to accommodate a conduit, the other ends of said jaws being pivoted together on an axis perpendicular to the axis of said channel formed by said closed jaws, and a cutting member pivoted on one of said jaws on an axis parallel with the axis of said pivot for the ends of said jaws, said member having a handle at one end and a cutting blade at the other end.

2. A cutting tool in accordance with claim 1, in which the handle ends of said jaws are semicircular to form a channel having an axis coincident with the axis of said channel formed by said closed jaws.

3. A cutting tool in accordance with claim 1, in which the inner surfaces of said jaws are corrugated to accommodate the curvature of a conduit.

4. A cutting tool in accordance with claim 1, in which said pivot of said jaws is positioned at a greater distance from the axis of the channel formed by said jaws when closed than that between said axis and the inner surfaces of said jaws.

LUTHER F. MALLASCH.

References Cited in the file of this patent

UNITED STATES PATENTS

| Number | Name | Date |
|---|---|---|
| 298,588 | Jencks | May 13, 1884 |
| 1,508,687 | Gilley | Sept. 10, 1924 |
| 1,670,250 | Froschhauser | May 15, 1928 |
| 1,686,044 | Stott | Oct. 2, 1928 |
| 1,894,329 | Talmadge | Jan. 17, 1933 |
| 2,161,152 | Furrer | June 6, 1939 |
| 2,207,044 | Whittaker | July 9, 1940 |
| 2,493,941 | Belden | Jan. 10, 1950 |